United States Patent [19]

Kallfass et al.

[11] 4,026,815
[45] May 31, 1977

[54] METHOD FOR PREVENTING CORROSION IN WATER-CARRYING SYSTEMS

[75] Inventors: Herbert Kallfass; Christian Rasp; Reinhard Schliebs, all of Cologne, Germany

[73] Assignee: Bayer Aktiengesellschaft, Leverkusen, Germany

[22] Filed: June 20, 1974

[21] Appl. No.: 481,430

[30] Foreign Application Priority Data

June 30, 1973 Germany .................... 2333353

[52] U.S. Cl. .................. 252/180; 210/58; 21/2.7 R; 252/DIG. 11; 252/DIG. 17; 252/389 A
[51] Int. Cl.² ............... C02B 5/06; C23F 11/10
[58] Field of Search .... 252/180, DIG. 11, DIG. 17, 252/389 A; 210/58; 21/2.7 R

[56] References Cited

UNITED STATES PATENTS 3,723,347  3/1973  Mitchell ........................ 210/58
3,752,760  8/1973  Gordon et al. ................. 210/58

FOREIGN PATENTS OR APPLICATIONS 2,141,983  8/1971  Germany

*Primary Examiner*—Mayer Weinblatt
*Attorney, Agent, or Firm*—Burgess, Dinklage & Sprung

[57] ABSTRACT

In the inhibition of corrosion and scale formation in a water-carrying system wherein to the water there is added a phosphonocarboxylic acid of the formula

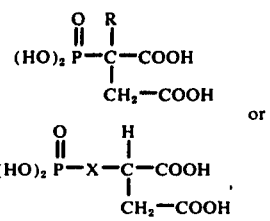

or in which
R is hydrogen, an alkyl, alkenyl or alkinyl radical having up to 4 carbon atoms, an aryl, cycloalkyl or aralkyl radical, or the radical

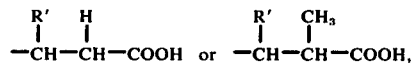

R' is hydrogen, an alkyl radical having up to 4 carbon atoms or a carboxyl radical; and
X is

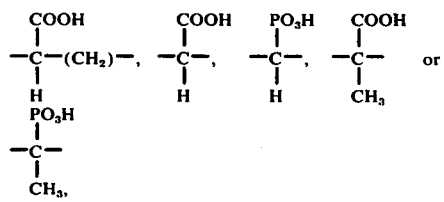

the improvement which comprises further adding to the water about 5 to 500% by weight of the phosphonocarboxylic acid of at least one member selected from the group consisting of a benzimidazole derivative, polyacrylamide, polyethyleneimine, polyvinylpyrrolidone and lignin sulfonate.

8 Claims, No Drawings

METHOD FOR PREVENTING CORROSION IN WATER-CARRYING SYSTEMS

This invention relates to a method for preventing corrosion in water-carrying systems by adding an agent based on phosphonocarboxylic acids or the salts thereof, and other synergistically active substances.

Corrosion and scale formation are among the more serious problems encountered in water engineering, for example in cases where untreated water is used for cooling purposes.

Corrosion of the metals used as materials for water circulation vessels, such as steel, aluminum, copper and corresponding alloys, can largely be attributed to the action of oxygen and carbon dioxide dissolved in the water. Preventing corrosion by removing the oxygen, for example by adding hydrazine or sulfite, is not possible in the case of open cooling circuits, for example, on economic and technical grounds, with the result that, in practice, corrosion inhibitors, for example chromates or polyphosphates, have to be added to the cooling water.

The use of chromates, which are undoubtedly extremely effective corrosion inhibitors, involves serious disadvantages on account of their known toxicity and, for this reason, is very often undesirable.

Scale formation in a cooling circuit, which is largely attributable to the deposition of carbonates, sulfates, phosphates and hydroxides of calcium and magnesium on the heat-transfer surfaces, adversely affects heat-transfer in the heat exchangers and, hence, reduces the efficiency of the installation. In addition, the coatings can promote corrosion through the formation of ventilating elements.

Hitherto, polyphosphates have been added to cooling waters not only for preventing corrosion, but also for preventing scale formation. The various polymeric phosphates exert their effect by forming water-soluble complexes with the calcium and magnesium salts responsible for hardness. The polyphosphates also have a so-called "threshold effect", in other words when added in substoichiometric quantities, they are able to prevent the formation of a firmly adhering scale covering by disturbing growth of the crystal lattice.

Unfortunately, polyphosphates are attended by the serious disadvantage that they are not stable at the temperatures encountered and are hydrolyzed relatively easily into orthophosphates, so that their corrosion-inhibiting effect is impaired, in addition to which fouling of the circuit is promoted by the inevitable formation of sludge. Another disadvantage of phosphates is that they promote growth of algae in the cooling circuit and contribute to undesirable eutrophizing of waters in general.

It has also been proposed to use phosphonocarboxylic acids which, optionally together with zinc salts or other known additives for example, afford outstanding protection against corrosion and scale formation.

While these systems are marked improvements, it is an object of the invention to produce still greater inhibition in corrosion and scale formation.

In accordance with the invention it has been found that such enhanced inhibitory action can be achieved by adding to water containing a phosphonocarboxylic acid of the formula

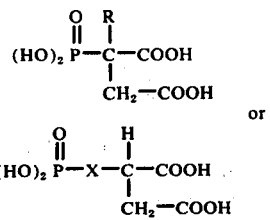

or

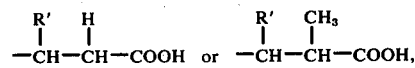

in which
R is hydrogen, an alkyl, alkenyl or alkinyl radical having up to 4 carbon atoms, an aryl, cycloalkyl or aralkyl radical, or the radical $$-\underset{\underset{R'}{|}}{C}H-\underset{\underset{H}{|}}{C}H-COOH \quad \text{or} \quad -\underset{\underset{R'}{|}}{C}H-\underset{\underset{CH_3}{|}}{C}H-COOH,$$

R' is hydrogen, an alkyl radical having up to 4 carbon atoms or a carboxyl radical; and
X is

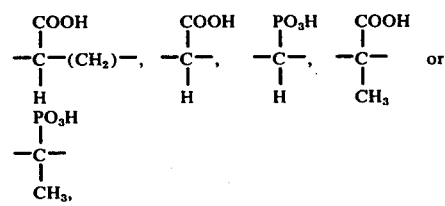

about 5 to 500% by weight of the phosphonocarboxylic acid of at least one member selected from the group consisting of a benzimidazole derivative, polyacrylamide, polyethyleneimine, polyvinylpyrrolidone and lignin sulfonate.

Suitable phosphonocarboxylic acids are primarily the following compounds:
α-methylphosphonosuccinic acid,
phosphonosuccinic acid,
1-phosphonopropane-2,3-dicarboxylic acid, and
2-phosphonobutane-1,2,4-tricarboxylic acid.

Others which could also be used include:
α-allyl-phosphonosuccinic acid, α-p-chlorophenyl-phosphonosuccinic acid,
α-propargyl-phosphonosuccinic acid,
α-benzyl-phosphonosuccinic acid,
α-cyclohexyl-phosphonosuccinic acid,
2-phosphono-3-(α-methyl-carboxymethyl)-hexane-1,2,4-tricar carboxylic acid,
2,2-diphosphono-butane-3,4-dicarboxylic acid, and the like.

The production of these and other suitable phosphonocarboxylic acids is described, for example, in German Offenlegungsschrift No. 2,015,068 and in German Offenlegungsschrift No. 2,217,692.

The quantity in which the phosphonocarboxylic acids are added can fluctuate within wide limits. However, it is best to add from about 5 to 100 g of phosphonocarboxylic acid per cubic meter of water.

The following compounds can be used as synergistically active additives: benzimidazole derivatives such as, for example,
Δ²-2-(ε-aminopentyl)-imidazoline
Δ²-1-(β-aminoethyl)-2-(ε-aminopentyl)-imidazoline
Δ²-2-(ε-aminopentyl)-thiazoline
2-(β-amino-β-methylpropyl)-benzimidazole 2-(δ-aminobutyl)-benzimidazole
2-(ε-aminopentyl)-benzimidazole
2-(λ-aminoundecyl)-benzimidazole
2-(ε-methylaminopentyl)-benzimidazole
2-(ε-aminopentyl)-1-phenylbenzimidazole
2-(ε-aminopentyl)-5-methylbenzimidazole
2-(γ-phenylaminopropyl)-5-methylbenzimidazole
2-(γ-aminopropyl)-benzthiazole
2-(β-amino-β-methylpropyl)-benthiazole
2-(ε-aminopentyl)-benzthiazole
2-(γ-methylaminopropyl)-benthiazole
2-(ε-dimethylaminopentyl)-benzimidazole.

Above all, benzimidazole derivatives of this kind also provide bright metals, especially copper, with effective protection. In addition, these compounds are also extremely effective in preventing the corrosion of carbon steel.

The concentration of benzimidazoles to be maintained in water-carrying systems is preferably about 0.1 to 100 ppm, particularly about 0.5 to 50 ppm, based on the water used.

Suitable polyacrylamides and polyacrylamide derivatives include compounds corresponding to the following general formula:

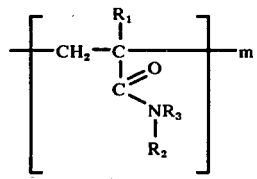

in which
R₁ is methyl, chlorine, phenyl, or preferably hydrogen; and
R² and R³ each independently is a lower alkyl radical such as methyl, ethyl or propyl, or preferably hydrogen, and
$m$ is about 500 to 25,000.

The polyethyleneimines used are compounds with a molecular weight of about 100,000 to 1,000,000.

Those compounds represented by the general formula:

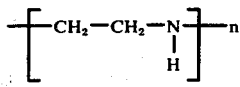

in which
$n$ is about 2,500 to 25,000,
are obtained in a known manner, for example by polymerizing ethylene imine or by reacting 1,2-dichloroethane with $NH_3$.

These synergistically active substances, as well as polyvinyl pyrrolidone (molecular weights between about 20,000 and 80,000) and lignin sulfonates, are most effective when added in quantities of about 0.05 to 100 ppm. The additives are preferably used in quantities of from about 0.5 to 50 ppm (based on the quantity of water present).

The effect of the corrosion-preventing systems according to the invention is further improved by the addition of known corrosion inhibitors such as, for example, zinc salts (for example zinc phosphate, zinc sulfate, zinc oxide or zinc chloride), phosphoric acid and phosphates (for example zinc, cadmium, sodium or potassium phosphates). In addition to these additives, it is of course also possible to use any of the additives described by H.O. Held in Kuhlwasser, Vulkan-Verlag, Essen, 1970, page 218.

The method according to the invention is illustrated in the following Examples in which the phosphonobutane-1,2,4-tricarboxylic acid used was in the form of a 30% by weight aqueous solution additionally containing 10% of $H_3PO_4$ and 5% of $Zn^{2+}$ ions, the percentages relating to the solution as a whole.

EXAMPLE 1

4 pipe sections of St 35 carbon steel, each pickled in hydrochloric acid, were fastened to a plastic stirrer and moved at a speed of 0.6 m/second in tap water at room temperature. Analytical data of the water:
Total hardness; 17° d
Carbonate hardness; 8° d
Chloride content; 180 mg/kg
Sulfate content ($SO_4$); 110 mg/kg
Total ions; 780 mg/kg After 4 days' testing, the pipe sections were again pickled and the weight loss was determined. The pH value was kept at around 7 during the test. A combination of 2-(ε-aminopentyl)-benzimidazole and phosphonobutane-1,2,4-tri carboxylic acid was used as corrosion inhibitor.

| Inhibitor concentration (ppm) | | Corrosion rate |
| --- | --- | --- |
| Phosphonobutane tricarboxylic acid | 2-(ε-aminopentyl)-benzimidazole | ($g/m^2 \cdot d$) |
| Control | | 21.05 |
| 20 | | 18.96 |
| 40 | | 0.74 |
| | 5 | 20.61 |
| | 40 | 16.99 |
| 20 | 1 | 5.67 |
| 20 | 3 | 4.95 |
| 20 | 5 | 2.45 |
| 20 | 40 | 2.39 |
| 40 | 1 | 0.39 |
| 40 | 5 | 0.37 |

EXAMPLE 2

4 pipe sections of St 35 carbon steel, each pickled in hydrochloric acid, were fastened to a plastic stirrer and moved at a speed or 0.6 m/second in tap water at room temperature. Analytical data of the water:
Total hardness; 17° d
Carbonate hardness; 8° d
Chloride content; 180 mg/kg
Sulfate content ($SO_4$); 110 mg/kg
Total ions; 780 mg/kg After 4 days' testing, the pipe sections were again pickled and the weight loss was determined. During the test, the pH value was kept at around 7.

The corrosion inhibitors used were mixtures of phosphonobutane-1,2,4-tricarboxylic acid and
a. Polyacrylamide (Retaminol CA 7586, a product of Bayer A.G., molecular weight approximately 10,106)
b. Polyethyleneimine (Retaminol E, a product of Bayer A.G., molecular weight approximately 200,000)
c. Lignin sulfonate (Wanin S, a product of Messrs. Holms Bruk, Sweden).

| Inhibitor concentration (ppm) | | | Corrosion rate |
|---|---|---|---|
| Phosphonobutane tricarboxylic acid | (a) | (b) | (c) | (g/m² · d) |
| Control | | | | 21.05 |
| 20 | | | | 18.96 |
| 20 | 0.5 | | | 2.21 |
| 20 | 1 | | | 2.14 |
| 20 | | 0.5 | | 5.59 |
| 20 | | 1 | | 3.16 |
| 20 | | | 5 | 6.36 |
| 20 | | | 50 | 4.05 |
| 40 | | | | 0.74 |
| 40 | 0.5 | | | 0.51 |
| 40 | 1 | | | 0.52 |
| 40 | | | 5 | 0.44 |
| 40 | | | 50 | 0.39 |
| | | | 5 | 19.47 |
| | | | 50 | 17.50 |
| | 0.5 | | | 18.92 |
| | 1 | | | 19.4 |
| | 30 | | | 17.52 |
| | | 0.5 | | 17.82 |
| | | 1.0 | | 17.15 |
| | | 30.0 | | 17.60 |

EXAMPLE 3

4 pipe sections of St 35 carbon steel, each pickled in hydrochloric acid, were fastenend to a plastic stirrer and moved at a speed of 0.6 m/second in tap water at room temperature.

Analytical data of the water:
Total hardness; 17° d
Carbonate hardness; 8° d
Chloride content; 180 mg/kg
Sulfate content (SO₄); 110 mg/kg
Total ions; 780 mg/kg After 4 days' testing, the pipe sections were again pickled and the weight loss was determined. During the test, the pH value was kept at around 7. The corrosion inhibitors used were mixtures of phosphonobutane-1,2,4-tricarboxylic acid and d. Polyvinylpyrrolidone (Luviskol K 30, a product of BASF, molecular weight approximately 40,000)
e. Polyvinylpyrrolidone (Luviskol K 90, a product of BASF, molecular weight approximately 700,000).

| Inhibitor concentration | | | Corrosion rate |
|---|---|---|---|
| Phosphonobutane tricarboxylic acid | (d) | (e) | (g/m² · d) |
| Control | | | 21.05 |
| 20 | | | 18.96 |
| 20 | 1 | | 9.55 |
| 20 | 5 | | 4.32 |
| 20 | 20 | | 5.67 |
| 20 | | 1 | 9.98 |
| 20 | | 5 | 11.1 |
| 20 | | 20 | 6.91 |
| 40 | | | 0.74 |
| 40 | 1 | | 0.41 |
| 40 | 5 | | 0.39 |
| 40 | 20 | | 0.42 |
| | 1 | | 18.26 |
| | 5 | | 18.10 |
| | 20 | | 18.70 |
| | | 1 | 19.20 |
| | | 5 | 18.50 |
| | | 20 | 18.60 |

It will be appreciated that the instant specification and examples are set forth by way of illustration and not limitation, and that various modifications and changes may be made without departing from the spirit and scope of the present invention.

What is claimed is:

1. In the inhibition of corrosion and scale formation in a water-carrying system wherein to the water there is added about 5 to 100 g/m³ of a phosphonocarboxylic acid of the formula

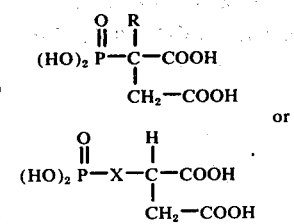

or

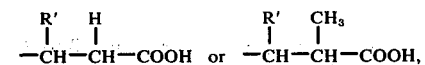

in which
R is hydrogen, an alkyl, alkenyl or alkinyl radical having up to 4 carbon atoms, a phenyl, cycloalkyl or phenylalkyl radical, or the radical $$\begin{array}{cc} R' & H \\ | & | \\ -CH-CH-COOH \end{array} \quad \text{or} \quad \begin{array}{cc} R' & CH_3 \\ | & | \\ -CH-CH-COOH, \end{array}$$

R' is hydrogen, an alkyl radical having up to 4 carbon atoms or a carboxyl radical; and
X is

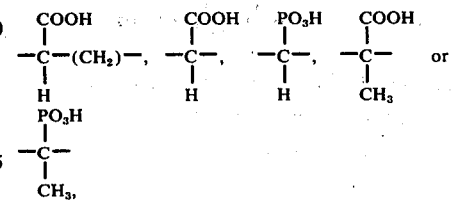

the improvement which consists essentially of further adding to the water about 0.05 to 100 ppm, constituting about 5 to 500% by weight of the phosphonocarboxylic acid, of at least one member selected from the group consisting of a benzimidazole derivative selected from the group consisting of Δ²-2-(ε-aminopentyl)-imidazoline,
Δ²-1-(β-aminoethyl)-2-(ε-aminopentyl)-imidazoline,
Δ²-2-(ε-aminopentyl)-thiazoline,
2-(β-amino-β-methylpropyl)-benzimidazole,
2-(δ-aminobutyl)-benzimidazole,
2-(ε-aminopentyl)-benzimidazole,
2-(λ-aminoundecyl)-benzimidazole,
2-(ε-methylaminopentyl)-benzimidazole,
2-(ε-aminopentyl)-1-phenylbenzimidazole,
2-(ε-aminopentyl)-5-methylbenzimidazole,
2-(γ-phenylaminopropyl)-5-methylbenzimidazole,
2-(γ-aminopropyl)-benzthiazole,
2-(β-amino-β-methylpropyl)-benzthiazole,
2-(ε-aminopentyl)-benzthiazole,
2-(γ-methylaminopropyl)-benzthiazole, and
2-(ε-dimethylaminopentyl)-benzimidazole,
polyacrylamide with a molecular weight of about 30,000 to 2,000,000, polyethyleneimine with a molecular weight of about 100,000 to 1,000,000, polyvinylpyrrolidone with a molecular weight of about 20,000 to 800,000, and lignin sulfonate.

2. A method as claimed in claim 1, wherein the added member is a benzimidazole derivative.

3. A method as claimed in claim 1, wherein the added member is a polyacrylamide.

4. A method as claimed in claim 1, wherein the added member is a polyethyleneimine.

5. A corrosion inhibitory composition consisting essentially of a phosphonocarboxylic acid of the formula

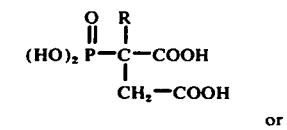

or

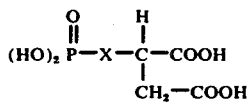

in which

R is hydrogen, an alkyl, alkenyl or alkinyl radical having up to 4 carbon atoms, a phenyl, cycloalkyl or phenylalkyl radical, or the radical

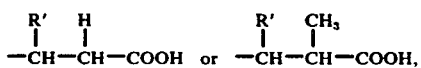

R' is hydrogen, an alkyl radical having up to 4 carbon atoms or a carboxyl radical; and X is

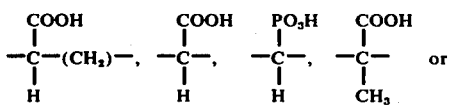

and
about 0.05 to 100 ppm, constituting about 5 to 500% by weight of the phosphonocarboxylic acid, of at least one member selected from the group consisting of a benzimidazole derivative selected from the group consisting of Δ²-2-(ε-aminopentyl)-imidazoline,
Δ²-1-(β-aminoethyl)-2-(ε-aminopentyl)-imidazoline,
Δ²-2-(ε-aminopentyl)-thiazoline,
2-(β-amino-β-methylpropyl)-benzimidazole,
2-(δ-aminobutyl)-benzimidazole,
2-(ε-aminopentyl)-benzimidazole,
2-(λ-aminoundecyl)-benzimidazole,
2-(ε-methylaminopentyl)-benzimidazole,
2-(ε-aminopentyl)-1-phenylbenzimidazole,
2-(ε-aminopentyl)-5-methylbenzimidazole,
2-(γ-phenylaminopropyl)-5-methylbenzimidazole,
2-(γ-aminopropyl)-benzthiazole,
2-(β-amino-β-methylpropyl)-benzthiazole,
2-(ε-aminopentyl)-benzthiazole,
2-(γ-methylaminopropyl)-benzthiazole, and
2-(ε-dimethylaminopentyl)-benzimidazole, polyacrylamide with a molecular weight of about 30,000 to 2,000,000, polyethyleneimine with a molecular weight of about 100,000 to 1,000,000, polyvinylpyrrolidone with a molecular weight of about 20,000 to 800,000, and lignin sulfonate.

6. A composition according to claim 5 wherein said member is a benzimidazole derivative.

7. A composition according to claim 5 wherein said member is a polyacrylamide.

8. A composition according to claim 5 wherein said member is a polyethyleneimine.

* * * * *